(12) United States Patent
Kadota

(10) Patent No.: US 8,619,295 B2
(45) Date of Patent: Dec. 31, 2013

(54) COMPUTER READABLE MEDIUM HAVING FACSIMILE DRIVER PROGRAM FACSIMILE SYSTEM AND COMPUTER EXECUTABLE METHOD USING THE FACSIMILE DRIVER PROGRAM

(75) Inventor: Masatoshi Kadota, Takahama (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 503 days.

(21) Appl. No.: 12/916,654

(22) Filed: Nov. 1, 2010

(65) Prior Publication Data

US 2011/0102856 A1    May 5, 2011

(30) Foreign Application Priority Data

Nov. 3, 2009    (JP) ................... 2009-252531

(51) Int. Cl.
*G06F 3/12*    (2006.01)

(52) U.S. Cl.
USPC ......... 358/1.15; 358/1.16; 358/407; 358/444; 358/468

(58) Field of Classification Search
USPC .................. 358/1.15, 1.16, 407, 444, 468
See application file for complete search history.

(56) References Cited

U.S. PATENT DOCUMENTS

| | | | | | |
|---|---|---|---|---|---|
| 5,461,488 | A | * | 10/1995 | Witek | 358/402 |
| 6,145,084 | A | * | 11/2000 | Zuili et al. | 726/3 |
| 6,301,611 | B1 | * | 10/2001 | Matsumoto et al. | 709/217 |
| 2001/0056538 | A1 | | 12/2001 | Amano | |
| 2002/0191228 | A1 | * | 12/2002 | Ishibashi | 358/442 |

FOREIGN PATENT DOCUMENTS

| | | |
|---|---|---|
| JP | 11-164042 | 6/1999 |
| JP | 2000-232567 | 8/2000 |
| JP | 2002-010008 A | 1/2002 |
| JP | 2005-092810 A | 4/2005 |
| JP | 2006-345232 A | 12/2006 |

OTHER PUBLICATIONS

JP Notification of Reason for Refusal dated Sep. 1, 2011, corresponding Application No. 2009-252531; English Translation.
Notification of Reasons for Refusal for corresponding Japanese Patent Application No. 2009-252531 dated May 29, 2012.

* cited by examiner

*Primary Examiner* — King Poon
*Assistant Examiner* — Jamares Q Washington
(74) *Attorney, Agent, or Firm* — Banner & Witcoff, Ltd.

(57) ABSTRACT

A computer readable medium having a computer program product stored thereon, the computer program product including instructions for ordering a computer to perform the following steps. The steps include a first receiving step of receiving a facsimile command from a client device configured to executes a facsimile application program, a first determining step of determining whether or not to allow communication with a facsimile device based on a predetermined condition when receiving the facsimile command at the first receiving step, and a transferring step of transferring the facsimile command received at the first receiving step to the facsimile device when the communication is allowed at the first determining step.

16 Claims, 11 Drawing Sheets

COMPUTER READABLE MEDIUM HAVING FACSIMILE DRIVER PROGRAM FACSIMILE SYSTEM AND COMPUTER EXECUTABLE METHOD USING THE FACSIMILE DRIVER PROGRAM

CROSS REFERENCE TO RELATED APPLICATION

The present application claims priority from Japanese Patent Application No. 2009-252531 filed on Nov. 3, 2009. The entire content of this priority application is incorporated herein by reference.

TECHNICAL FIELD

The present disclosure relates to a computer readable medium having a facsimile driver program, a facsimile system and a computer executable method using the facsimile driver program.

BACKGROUND

There has been known a facsimile device having a user restricting function that permits only correct users to perform facsimile transmission. In such a facsimile device, when receiving a call signal from an external information processing apparatus, the device decides the correctness of the user based on the identification information added to the call signal and the identification information that is previously registered.

However, to achieve a conventional user restricting function, the facsimile device should have a function for deciding the correctness of the user based on the identification information added to the call signal and the identification information that is previously registered. Therefore, the conventional user restricting function lacks versatility.

SUMMARY

According to an aspect of the present invention, a computer readable medium having a computer program product stored thereon, the computer program product including instructions for ordering a computer to perform the following steps. The steps include a first receiving step of receiving a facsimile command from a client device configured to executes a facsimile application program, a first determining step of determining whether or not to allow communication with a facsimile device based on a predetermined condition when receiving the facsimile command at the first receiving step, and a transferring step of transferring the facsimile command received at the first receiving step to the facsimile device when the communication is allowed at the first determining step.

BRIEF DESCRIPTION OF THE DRAWINGS

Illustrative aspects in accordance with the present invention will be described in detail with reference to the following drawings wherein.

DETAILED DESCRIPTION

<Illustrative Aspect>

An illustrative aspect of the present invention will be hereinafter explained with reference to FIGS. 1 to 9.

(1) Construction of Facsimile System

Figure 1:
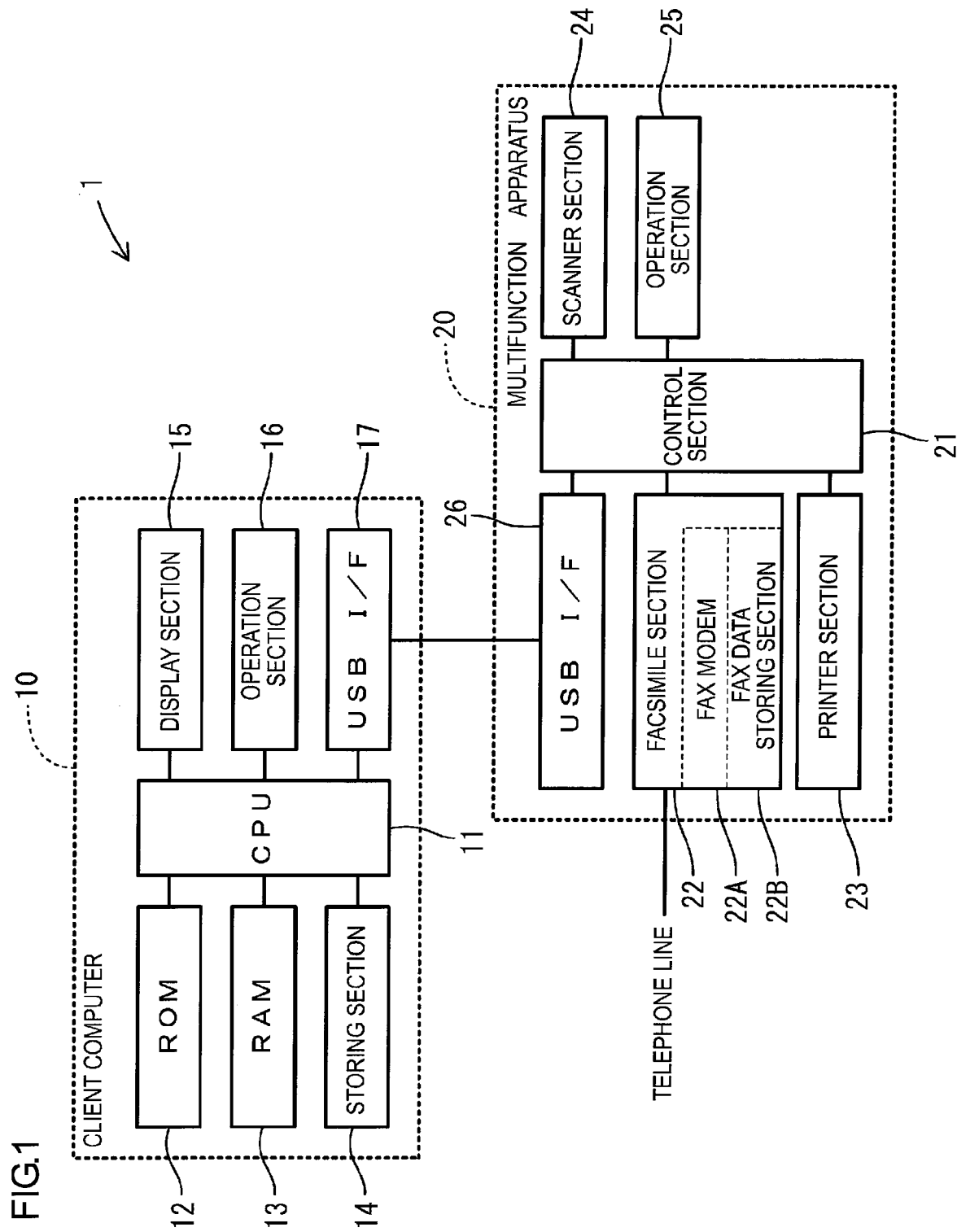
FIG. 1 is a block diagram illustrating a facsimile system according to an illustrative aspect of the present invention.

As illustrated in FIG. 1, a facsimile system 1 comprises a client computer 10 and a multifunction apparatus 20. In the illustrative aspect, the client computer 10 functions as a client device and a computer. In the illustrative aspect, a facsimile is abbreviated to fax.

(1-1) Electrical Configuration of Client Computer

The client computer 10 (an example of a client device and a computer) comprises a CPU 11, a ROM 12, a RAM 13, a storing section 14, a display section 15, an operation section 16 and an USB interface (USB I/F) 17. The client device is configured to execute a facsimile application program.

The CPU 11 (an example of a computer to perform a first receiving step, a first determining step, a transferring step, an obtaining step and a second determining step) executes various computations based on programs stored in the ROM 12 and the storing section 14 and controls each component in the client computer 10. The ROM 12 stores various programs that are executed by the CPU 11 and data. The RAM 13 is a main memory that is used when the CPU 11 executes various processes.

The storing section 14 is an external memory for storing various programs and data using a non-volatile storing medium such as a hard disk or a flash memory. The storing section 14 stores an operating system (OS), a fax application (an example of a facsimile application program), a fax driver (an example of a facsimile driver program) and permission database (permission DB). In the present illustrative aspect, Linux (registered trademark) is used as an OS. The OS is not limited to Linux but may be other different OS.

The display section 15 is comprised of a display device such as a CRT or a liquid crystal display.

The operation section 16 (an example of a registering step) is comprised of an input device such as a mouse or a keyboard.

The USB interface 17 (an example of a second receiving step) is connected to the multifunction apparatus 20 via a USB cable.

In the present illustrative aspect, it is supposed that a plurality of users use a fax application via one client computer 10. In such a case, each user may go to the client computer 10 to directly login the computer 10 and use the fax application or may use the fax application with remote login to the computer 10 from another computer via a communication network.

In the permission DB, transmission source information representing transmission sources of AT commands (an example of a facsimile command) that are permitted to communicate with the multifunction apparatus 20 is registered. The transmission source represents a user who transmits the AT command, a group to which a user belong or a fax application. Namely, although the number of the client computer 10 is one, the transmission sources of the AT commands are not necessarily same.

In the permission DB, permission or prohibition of communication (permission or prohibition of fax transmission or fax reception) is set by a unit of, for example, a user, a group to which a user belong or a fax application. Hereinafter, the unit (a user, a group or a fax application) is simply referred to as a transmission source.

An administrator of the client computer 10 operates the operation section 16 to register the transmission source information in the permission DB and set permission or prohibition of communication in the permission DB.

(1-2) Electrical Configuration of Multifunction Apparatus

The multifunction apparatus 20 (an example of a facsimile device) has a fax transmission/reception function, a printing function, a scanning function and a copying function. The multifunction apparatus 20 includes a control section 21, a facsimile section 22, a printer section 23, a scanner section 24, an operation section 25 and a USB interface (USB I/F) 26.

The control section 21 comprises a CPU, a ROM and a RAM. The CPU controls each component in the multifunction apparatus 20 based on various programs stored in the ROM. The ROM stores various programs and data used at the time of a control operation by the CPU. The RAM is a main memory used when the CPU executes various processing.

The facsimile section 22 comprises a fax modem 22A and a fax data storing section 22B and is connected to a telephone line. In the facsimile section 22, the received fax data is printed by the printer section 23 and the image read by the scanner section 24 is transmitted via fax.

Further, the facsimile section 22 receives data from a PC via the USB I/F and transmits the received data to an external facsimile device via a telephone line and also the facsimile section 22 receives fax data from the external facsimile device and transmits the received fax data to the PC via the USB I/F. In such a case, the client computer 10 directly accesses to the fax modem 22A via the USB interface 26. The communication between the PC 10 and the fax modem 22A is executed with using AT commands that have been known.

When the received fax data is transmitted to the client computer 10, the whole fax data is temporally stored in the data storing section 22B and a signal informing of incoming (RING) is transmitted to the client computer 10 after disconnection of the telephone line. The fax modem 22A is different from an ordinary fax modem in this point.

The client computer 10 may reject to receive the fax data from an external facsimile device. However, in the multifunction apparatus 20 according to the present illustrative aspect, the received fax data is temporally stored in the fax data storing section 22B and then transmitted to the client computer 10. Accordingly, even if the client computer 10 rejects to receive the fax data, the external facsimile device already completes transmission of the fax data. Therefore, a user of the external facsimile device is not forced to transmit the fax data again even if the client computer 10 rejects to receive the fax data.

The printer section 23 forms images on a recording medium such as a paper by a laser method, an LED method or an ink jet method.

The scanner section 24 reads images formed on a document such as a paper by a linear image sensor under control of the CPU and generates image data.

The operation section 25 includes operation buttons with which a user controls the multifunction apparatus 20 and a display for displaying various information.

The USB interface 26 is connected to the client computer 10 via the USB cable.

(2) Program Configuration of Fax Driver

Figure 2:
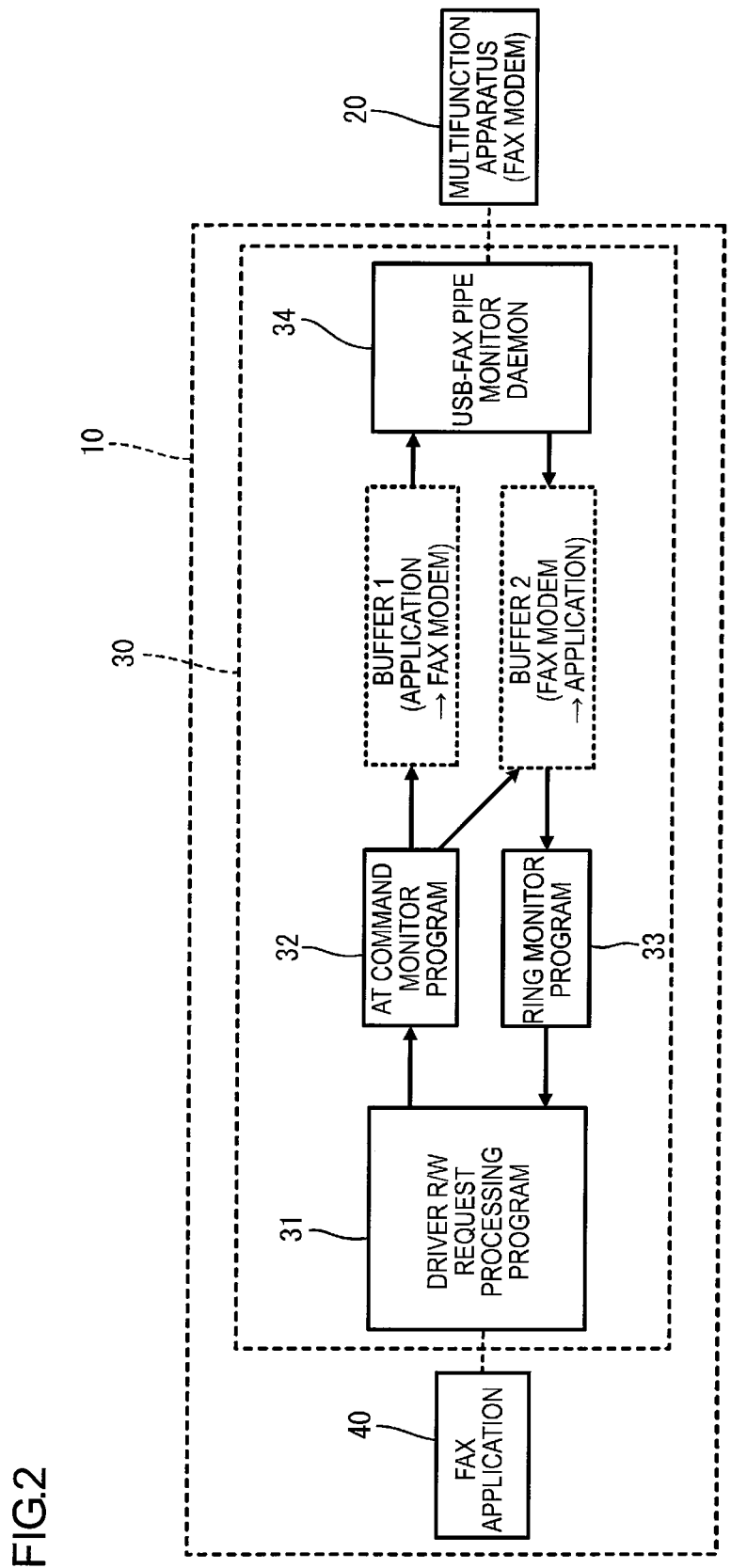
FIG. 2 is a block diagram illustrating a program configuration of a fax driver.

As illustrated in FIG. 2, the fax driver 30 is a program for relaying communication between the fax application 40 and the fax modem 22A, and it comprises a driver R/W request processing program 31, an AT command monitor program 32, a RING monitor program 33 and a USB-FAX pipe monitor daemon program 34.

The fax driver 30 other than the USB-FAX pipe monitor daemon program 34 is comprised as a kernel driver of Linux. A buffer 1 and a buffer 2 are buffer areas prepared in the RAM 13.

The CPU 11 functions as a fax driver section according to the fax driver 30 and functions as a fax application section according to a fax application 40. The CPU 11 functions as a driver R/W request processing program section according to the driver R/W request processing program 31, functions as an AT command monitor program section according to the AT command monitor program 32, functions as a RING monitor program section according to the RING monitor program 33, and functions as a USB-FAX pipe monitor daemon program section according to the USB-FAX pipe monitor daemon program 34.

The driver R/W request processing program 31 is executed for receiving a write request and a read request from the fax application 40. The write request and the read request will be explained later. When receiving a write request, the driver R/W request processing program 31 transfers the write request to the AT command monitor program 32. When receiving a read request, the driver R/W request processing program 31 transfers the read request to the RING monitor program 33.

When the write request of data is received from the fax application 40, the AT command monitor program 32 is executed for writing the data in the buffer 1. The data that is written in the buffer 1 includes various AT commands transmitted to the fax modem 22A and fax data transmitted to external facsimile devices. When writing data in the buffer 1, the AT command monitor program 32 monitors the requested write data and changes control according to the data. This process will be explained later.

When a read request is received from the fax application 40, the RING monitor program 33 is executed for transmitting the data written in the buffer 2 to the fax application 40 that has transmitted the read request. The data written in the buffer 2 includes a response code (result code) from the fax modem 22A in response to the AT command transmitted to the fax modem 22A, fax data received from external facsimile devices and error information. The RING monitor program 33 monitors data read from the buffer 2 and changes control according to the data. This process will be explained later.

The fax driver 30 also includes another program that is not illustrated in FIG. 2. According to the program, when a read request is received from the USB-FAX pipe monitor daemon 34, the data written in the buffer 1 is transmitted to the USB-FAX pipe monitor daemon 34, and when a write request is received from the USB-FAX pipe monitor daemon 34, the data is written in the buffer 2.

The USB-FAX pipe monitor daemon program (USB-FAX pipe monitor daemon) 34 is executed for monitoring the USB interface and relaying communication between the fax driver 30 and the fax modem 22A. A USB standard is not defined such that data is voluntarily transmitted from the USB interface to the application side. Therefore, the USB-FAX pipe monitor daemon 34 is included in the fax driver 30 to monitor the USB interface 17 from the fax driver 30 side.

If RS-232C is used for an interface with the multifunction apparatus 20 for example, a monitor program such as the USB-FAX pipe monitor daemon program is not necessary.

Figure 3:
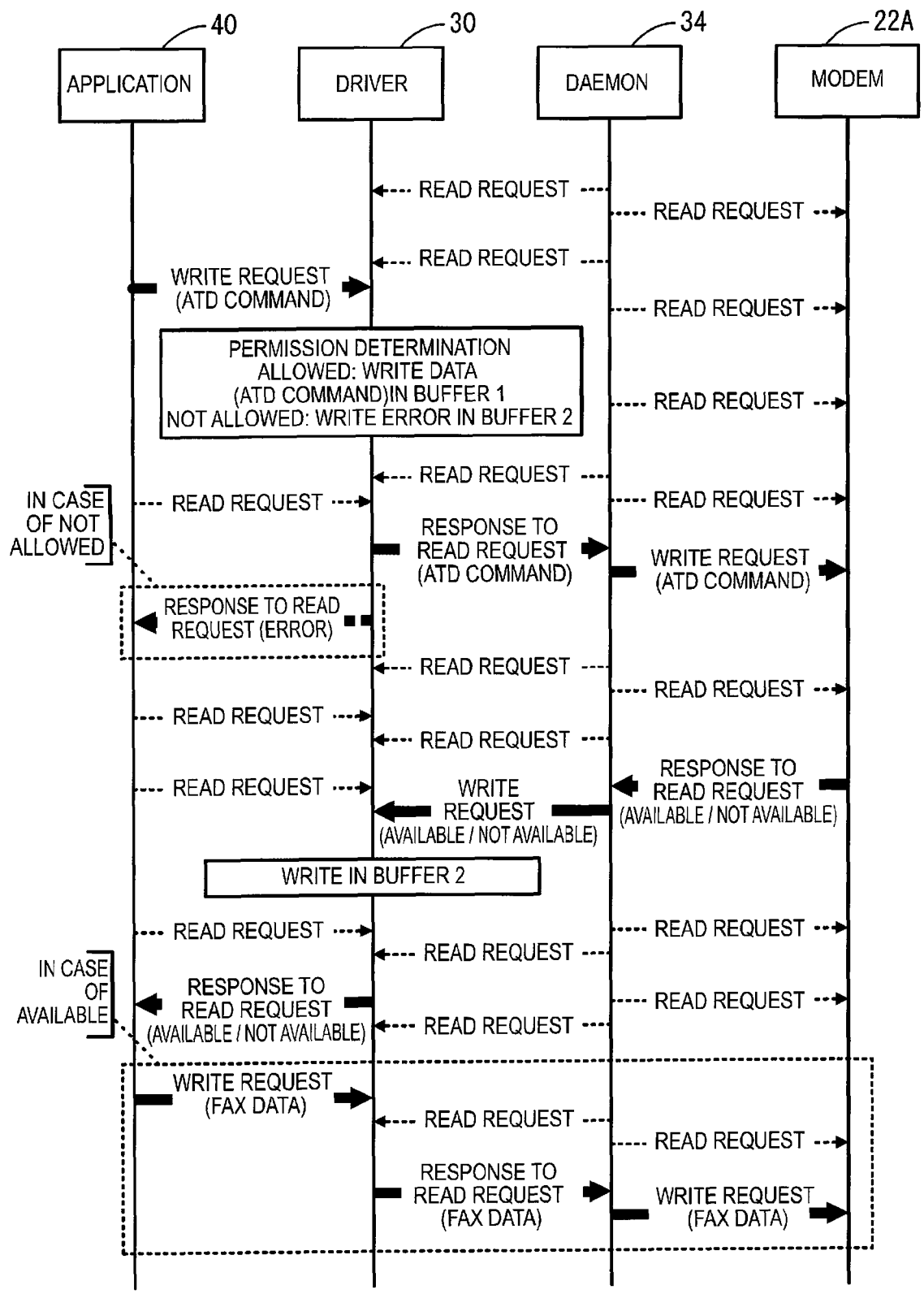
FIG. 3 is a sequence chart of fax transmission.

(3) Fax Transmission, Fax Reception and Automatic Incoming Setting (3-1) Sequence of Fax Transmission A sequence of the fax transmission will be explained with reference to FIG. 3. The USB-FAX pipe monitor daemon 34 is illustrated as a separate program from the fax driver 30 in FIG. 3 for easier explanation.

When receiving a command of fax transmission by a user, the fax application 40 transmits a write request of a command (ATD command) to which a dial number is followed to the fax driver 30. After the transmission of the write request of the ATD command, the fax application 40 transmits a read request to the fax driver 30 at predetermined time intervals.

When receiving the write request of the ATD command from the fax application 40, the fax driver 30 determines whether or not to permit communication with the fax modem 22A according to the transmission source of the write request (permission determination, an example of determination that is made based on predetermined conditions). This determination will be explained later.

When determining that the communication is not permitted, the fax driver 30 writes a result code representing an error in the buffer 2. When receiving a read request from the fax application 40 after writing of the error result code in the buffer 2, the fax driver 30 transmits an error written in the buffer 2 to the fax application 40 in response to the read request.

Thus, the ATD command is not actually transmitted to the fax modem 22A. However, the fax application 40 recognizes that the fax modem 22A transmits an error in response to the ATD command. Therefore, the fax application 40 executes an error process that is executed for an ordinary error (for example, line disconnection). Namely, the fax application 40 is not required to execute any special processing and this provides versatility to the program.

When determining to allow the communication with the fax modem 22A, the fax driver 30 writes the ATD command in the buffer 1.

The USB-FAX pipe monitor daemon 34 transmits a read request to the fax driver 30 at predetermined time intervals. When receiving a read request from the USB-FAX pipe monitor daemon 34, the fax driver 30 transmits the ATD command written in the buffer 1 to the USB-FAX pipe monitor daemon 34 in response to the read request.

When receiving the ATD command, the USB-FAX pipe monitor daemon program transmits a write request of the ATD command to the fax modem 22A via the USB interface 17.

The USB-FAX pipe monitor daemon 34 transmits a read request to the fax modem 22A at predetermined time intervals. When receiving a result code representing whether fax transmission is available or not from the fax modem 22A in response to the read request, the USB-FAX pipe monitor daemon 34 transmits a write request of the result code to the fax driver 30. For example, if the result code is "CONNECT", fax transmission is available, and if the result code is "BUSY" or "NO CARRIER", fax transmission is not available.

When receiving the write request of the result code from the USB-FAX pipe monitor daemon 34, the fax driver 30 writes the result code in the buffer 2. When receiving a read request from the fax application 40 after writing of the result code in the buffer 2, the fax driver 30 transmits the result code written in the buffer 2 to the fax application 40 in response to the read request.

The fax application 40 determines whether the received result code represents permission of fax transmission. If determining that the result code represents availability of fax transmission, the fax application 40 transmits a write request of fax data to the fax driver 30. The fax data is transmitted to the fax modem 22A and transmitted to an external facsimile device from the fax modem 22A. If determining that the result code represents unavailability of fax transmission, the fax application 40 terminates the transmission process.

(3-2) Fax Reception

Figure 4:
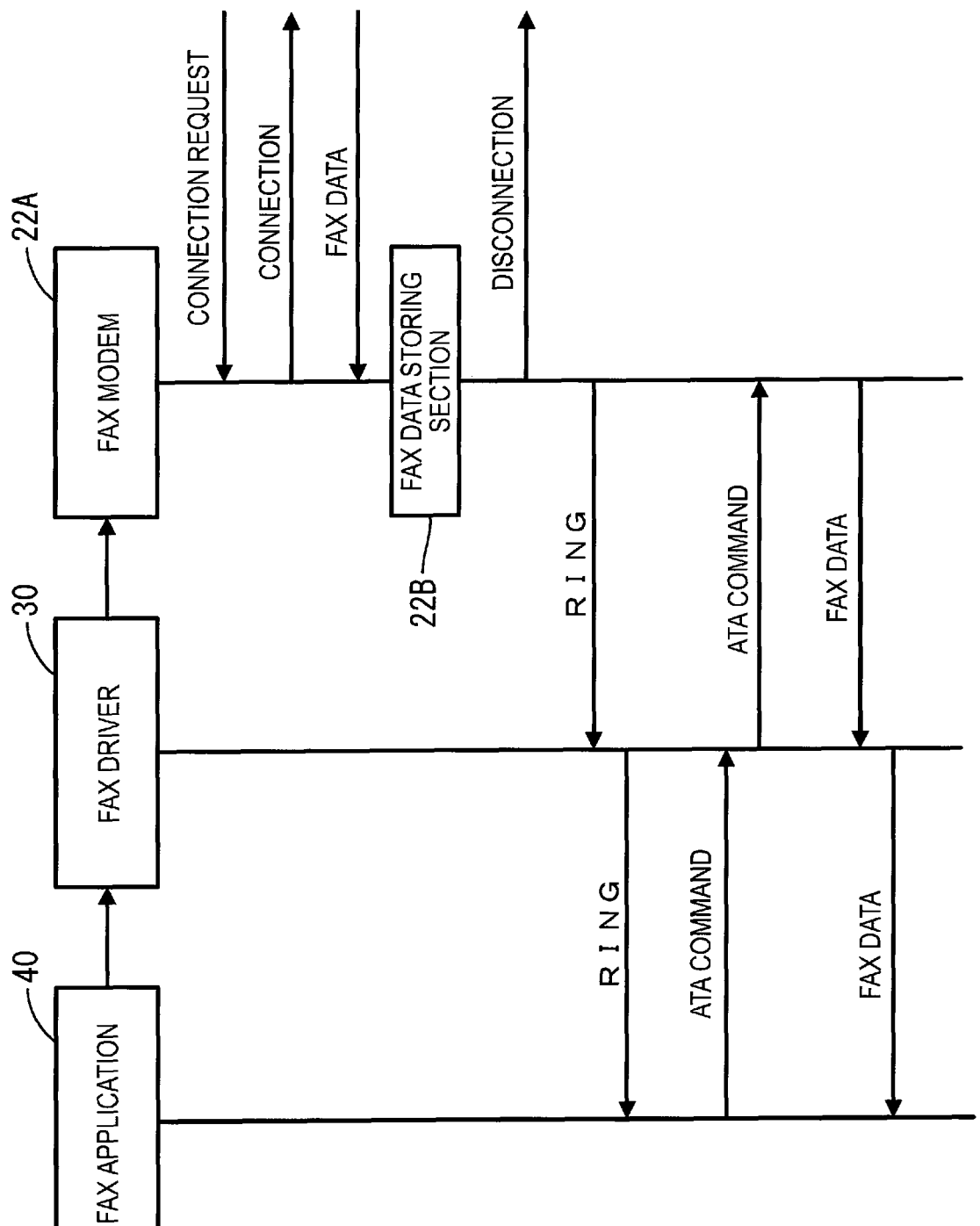
FIG. 4 is a sequence chart for general explanation of fax reception.

General explanation of fax reception will be made with reference to FIG. 4. The USB-FAX pipe monitor daemon program 34 is omitted here for easy understanding.

When receiving a connection request from an external facsimile device via the telephone line, the fax modem 22A connects the line and receives fax data and stores the received fax data in the fax data storing section 22B. When completing the fax reception, the fax modem 22A disconnects the line.

Processing after the line disconnection is different in a case that the fax modem 22A is set such that automatic incoming is not executed and in a case that the fax modem 22A is set such that automatic incoming is executed.

a) Setting Without Automatic Answer

A sequence of the fax reception in which automatic answer is not set to the fax modem 22A will be explained with reference to FIG. 4. When disconnecting the line, the fax modem 22A transmits a signal informing of incoming (RING) to the fax application 40 to inform of the fax incoming.

When receiving RING, the fax application 40 transmits a forced answer command (ATA command) to the fax modem 22A. If a user of the fax application 40 determines not to respond to the fax incoming, the command is not transmitted.

When receiving the ATA command from the fax application 40, the fax modem 22A transmits fax data stored in the fax data storing section 22B to the fax application 40.

b) Setting With Automatic Answer

When disconnecting the line, the fax modem 22A transmits RING a predetermined number of times, and then, if no ATA command is transmitted from the client computer 10, the fax modem 22A automatically transmits fax data to the fax application 40.

(3-2-1) Sequence of Fax Incoming

Figure 5:
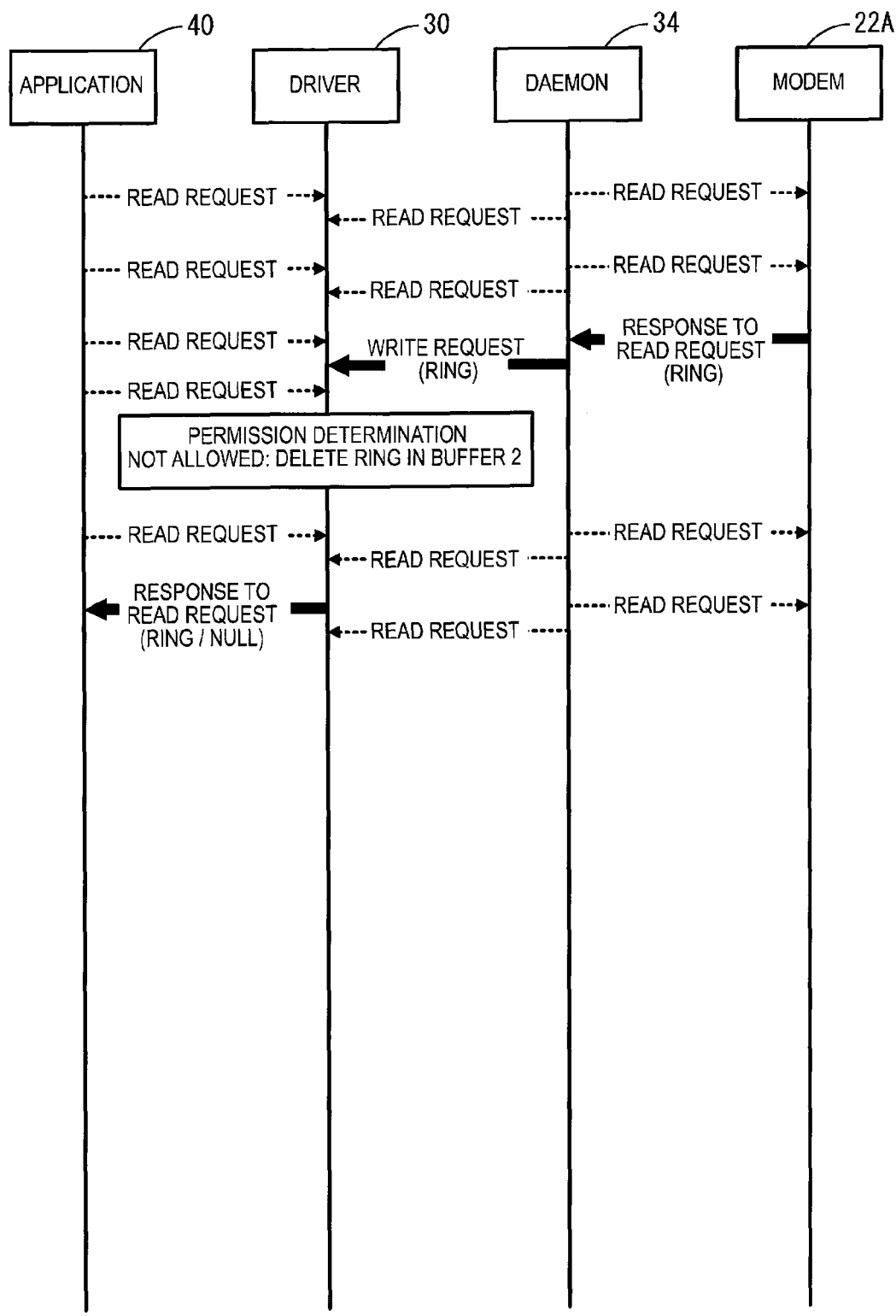
FIG. 5 is a sequence chart for informing of fax incoming according to a fax application.

A sequence in which the fax modem 22A informs the fax application 40 of fax incoming (RING) will be explained with reference to FIG. 5.

When receiving a read request from the USB-FAX pipe monitor daemon 34 after line disconnection, the fax modem 22A transmits RING to the USB-FAX pipe monitor daemon 34.

When receiving RING from the fax modem 22A, the USB-FAX pipe monitor daemon 34 transmits a write request of the RING to the fax driver 30.

When receiving the write request of the RING, the fax driver 30 writes the RING in the buffer 2. When receiving a read request from the fax application 40, the fax driver 30 determines whether or not to transfer the RING according to the transmission source of the read request. This determination will be explained later.

When determining to transfer the RING, the fax driver 30 transmits the RING stored in the buffer 2 to the fax application 40.

When determining not to transfer the RING, the fax driver 30 deletes the RING from the buffer 2.

(3-2-2) Sequence of Fax Reception

Figure 6:
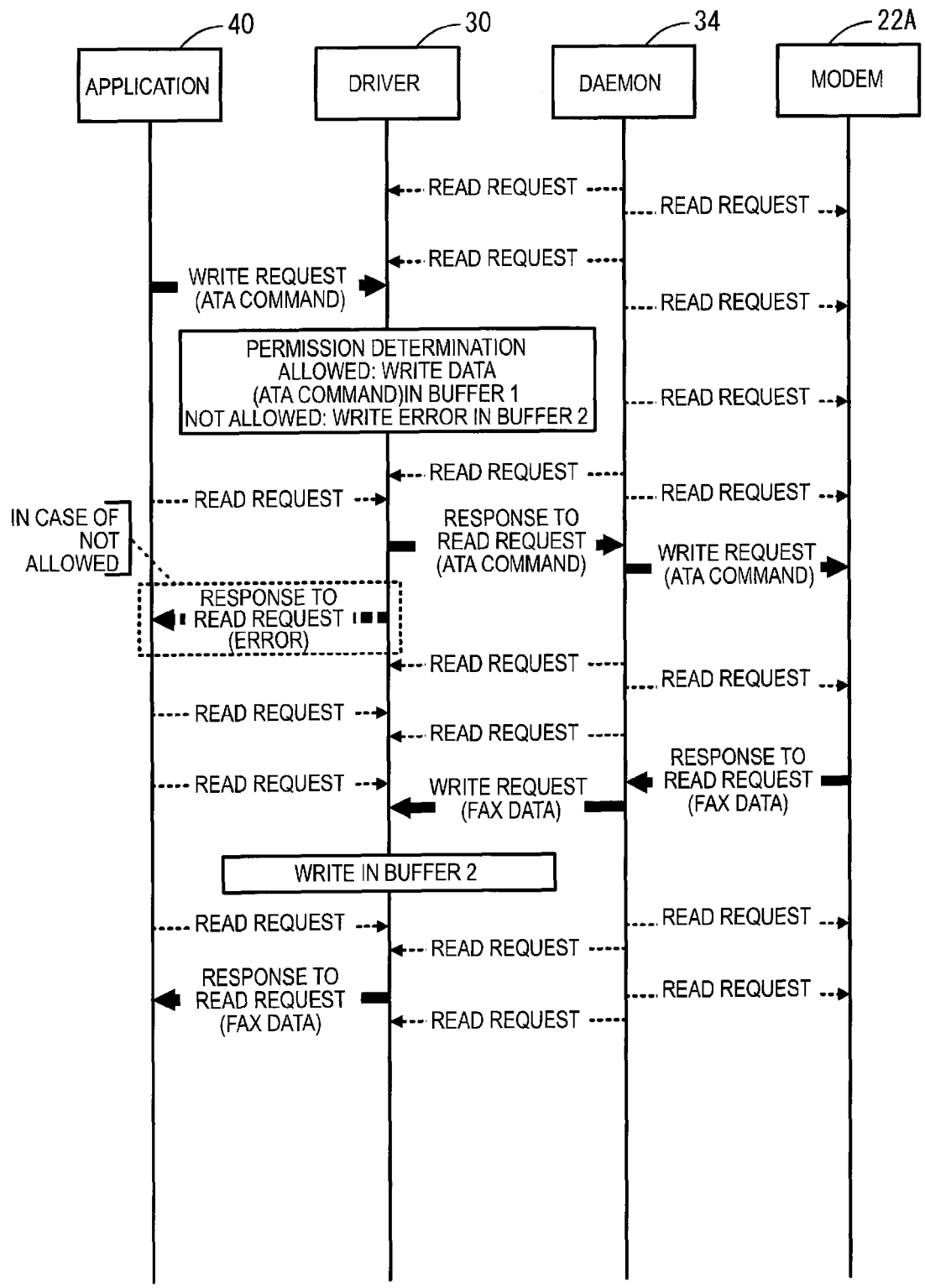
FIG. 6 is a sequence chart for requesting fax reception to a fax modem.

A sequence of fax reception will be explained with reference to FIG. 6. In the sequence, the fax application 40 that is informed of the fax incoming requests fax reception to the fax modem 22A.

When receiving the RING, the fax application 40 transmits a forced answer command (ATT command) to the fax driver 30. A flow of transmitting the ATA command from the fax application 40 to the fax modem 22A is substantially same as the flow of the transmission of the ATD command, and therefore explanation will be omitted.

When receiving the ATA command, the fax modem 22A transmits the fax data stored in the fax data storing section 22B to the USB-FAX pipe monitor daemon 34.

When receiving the fax data from the fax modem 22A, the USB-FAX pipe monitor daemon 34 transmits a write request of the fax data to the fax driver 30.

When receiving the write request of the fax data, the fax driver 30 writes the fax data in the buffer 2. When receiving a read request from the fax application 40, the fax driver 30 transmits the fax data stored in the buffer 2 to the fax application 40 in response to the read request.

(3-3) Automatic Answer Setting

Automatic answer is set by transmitting an ATS0 command to the fax modem 22A. A command of ATSn=x represents that a setting value of x is set to the nth register. The register satisfying that n=0 stores the setting value of automatic answer. When x is 0, the automatic answer is not executed. When x is set to a value other than zero, the automatic answer is executed. A user can set automatic answer at any time while the fax modem 22A is in an idle state.

The sequence for transmitting an ATS0 command is substantially same as the sequence for transmitting an ATD command or an ATA command.

(4) Determination Whether Communication with Fax Modem is Permitted or not

As described above, when receiving a write request from the fax application 40, the fax driver 30 determines whether communication between the fax application 40 and the fax modem 22A is permitted. The determination will be explained below.

Figure 7:
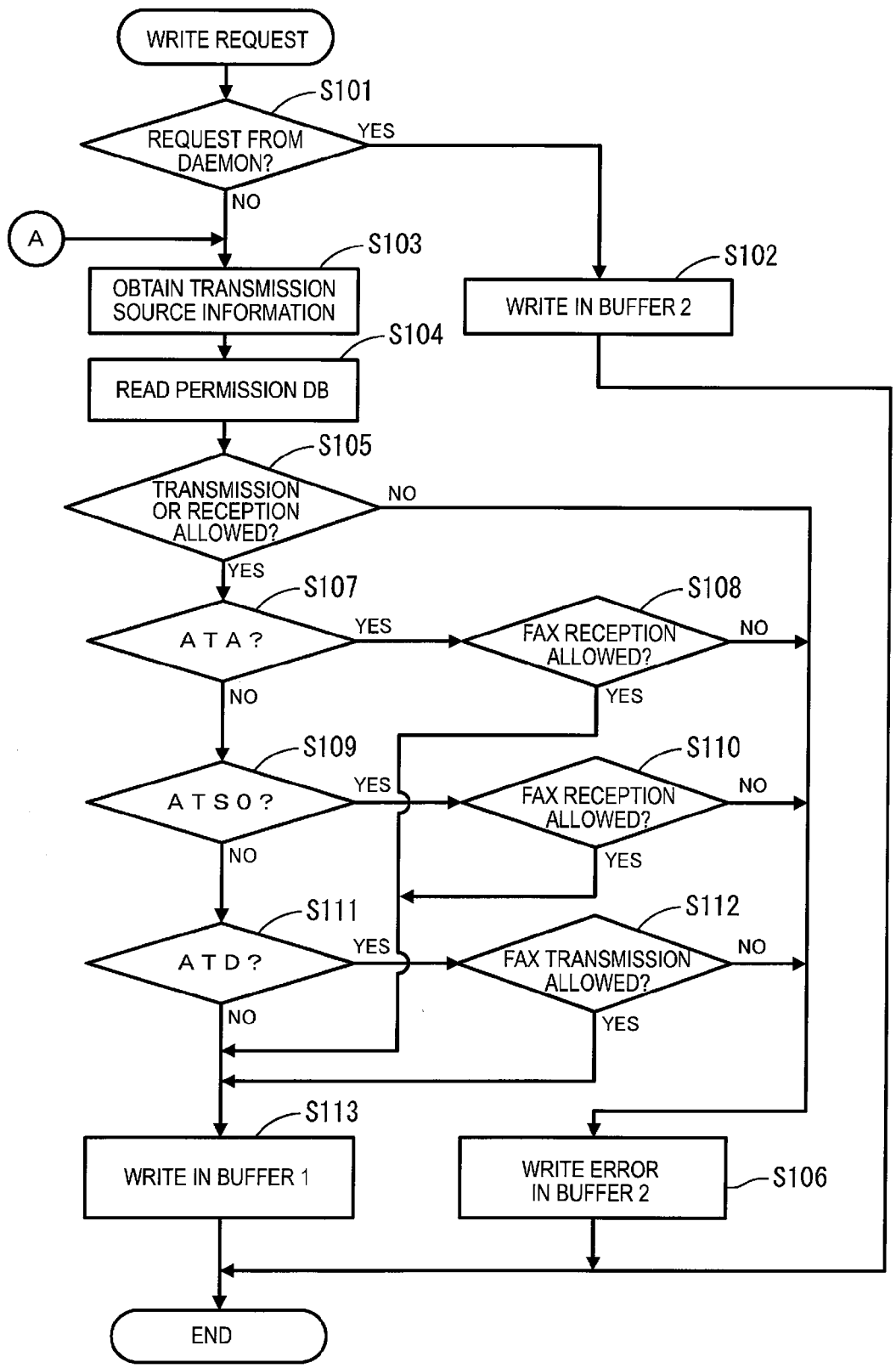
FIG. 7 is a flowchart illustrating a determination flow when receiving a write request.

A flow of determination when receiving a write request will be explained with reference to FIG. 7. The CPU 11 executes the AT command monitor program to execute this process. This process is started when the CPU 11 receives a write request via the fax application 40 or the USB-FAX pipe monitor daemon program 34.

At step 101, the CPU 11 determines whether the received write request is transmitted according to the USB-FAX pipe monitor daemon program 34. If the CPU 11 determines that it is transmitted according to the USB-FAX pipe monitor daemon program 34, the process proceeds to step 102 and if the CPU 11 determines that it is not transmitted according to the USB-FAX pipe monitor daemon program 34 (it is transmitted according to the fax application 40), the process proceeds to step 103.

At step 102, the CPU 11 writes the data (RING, a result code, fax data) received according to the USB-FAX pipe monitor daemon program 34 in the buffer 2.

At step 103, the CPU 11 obtains transmission source information representing a transmission source that transmitted the write request. The fax driver 30 is a kernel driver of Linux. Therefore, information representing a calling host in the kernel driver is automatically set to an internal variable. In the present illustrative aspect, the information is used as transmission source information.

The transmission source information includes, for example, a user ID (an example of user identification information) of a user who activates the fax application 40 to transmit the write request and a group ID of a group to which the user belongs.

At step 104, the CPU 11 reads the permission DB from the storing section 14.

At step 105, the CPU 11 determines whether fax transmission or fax reception is allowed for the transmission source information with reference to the permission DB (permission determination). The permission determination will be explained later. If the CPU 11 determines that fax transmission and fax reception are not allowed, the process proceeds to step 106, and if the CPU 11 determines that at least one of fax transmission and fax reception is allowed, the process proceeds to step 107.

At step 106, the CPU 11 writes an error in the buffer 2 and terminates the process.

At step 107, the CPU 11 determines whether the data that is requested to be written by the write request is a forced answer command (ATA command). If the CPU 11 determines that the data is an ATA command, the process proceeds to step 108 and if the CPU 11 determines that the data is not an ATA command, the process proceeds to step 109.

If the CPU 11 has determined that fax reception is allowed in step 108, the process proceeds from step 108 to step 113, and if the CPU 11 has determined that fax reception is not allowed, the process proceeds to step 106 and the CPU 11 writes an error in the buffer 2.

At step 109, the CPU 11 determines whether the data that is requested to be written is an automatic answer setting command (ATS0 command). If the CPU 11 determines that the data is an automatic answer setting command, the process proceeds to step 110, and if the CPU 11 determines that the data is not an automatic answer setting command, the process proceeds to step 111.

If the CPU 11 has determined that the fax reception is allowed in step 110, the process proceeds from step 110 to step 113, and if the CPU 11 has determined that the fax reception is not allowed, the process proceeds to step 106 and the CPU 11 writes an error in the buffer 2.

At step 111, the CPU 11 determines whether the data that is requested to be written is a dial command (ATD command). If the CPU 11 determines that the data is an ATD command, the process proceeds to step 112, and if the CPU 11 determines that the data is not an ATD command, the process proceeds to step 113.

If the CPU 11 has determined that the fax transmission is allowed in step 112, the process proceeds from step 112 to step 113, and if the CPU 11 has determined that the fax transmission is not allowed, the process proceeds to step 106 and the CPU 11 writes an error in the buffer 2.

At step 113, the CPU writes the data (AT command, fax data) that is transmitted according to the fax application 40 in the buffer 1.

There are various kinds of AT commands. If the data that is requested to be written is a command other than an ATA command, an ATS0 command and an ATD command (examples of a predetermined facsimile command), it is transmitted to the fax modem 22A without execution of the permission determination if at least one of fax transmission and fax reception is allowed.

(5) Determination Whether RING is Transferred or not

As described above, when receiving a read request from the fax application 40 with the RING being written in the buffer 2, the fax driver 30 determines whether to transfer the RING. The determination will be explained below.

Figure 8:
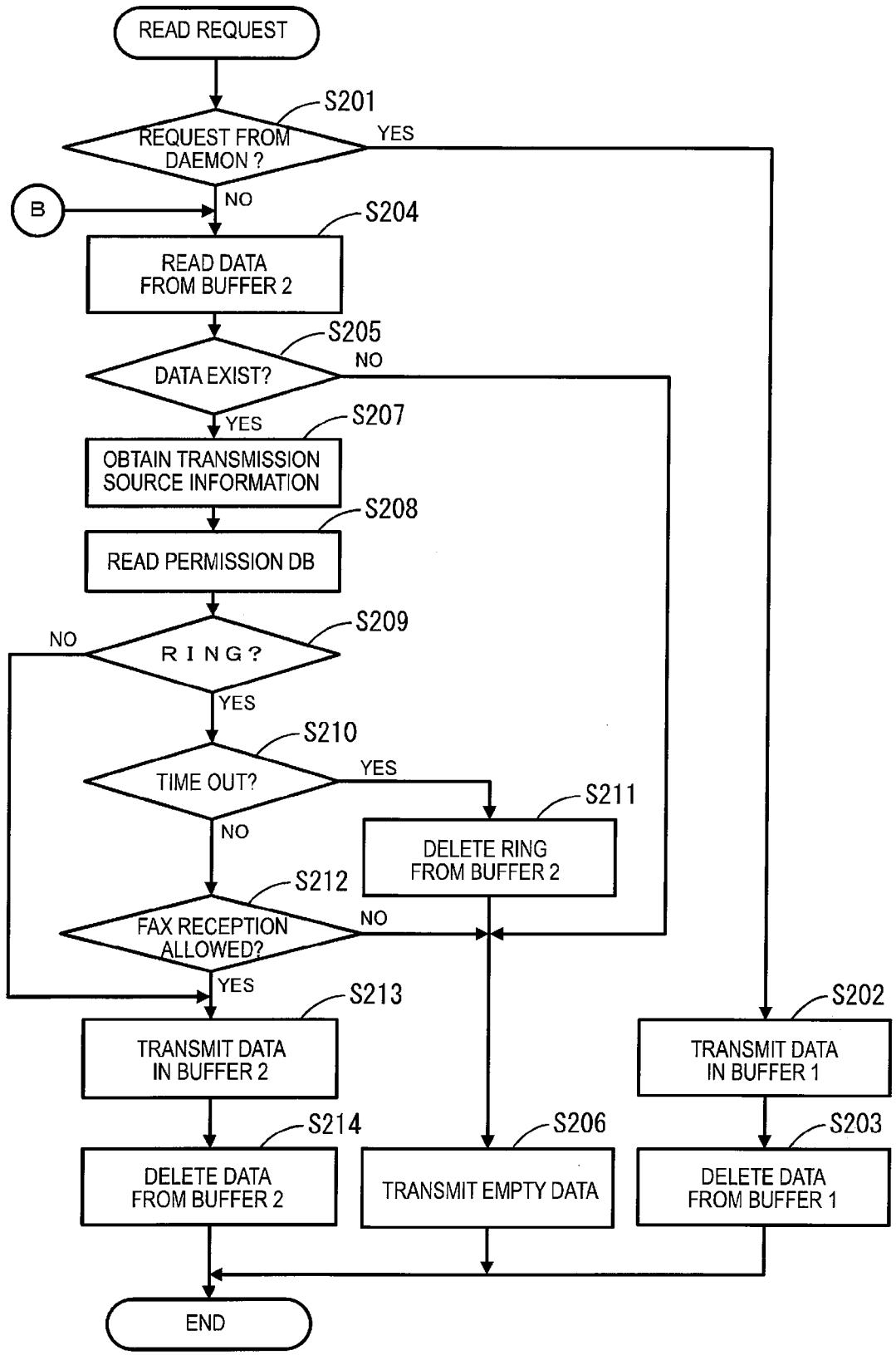
FIG. 8 is a flowchart illustrating a determination flow when receiving a read request.

A determination flow at the time of reception of a read request will be explained with reference to FIG. 8. The CPU 11 executes the RING monitor program to execute this process. This process is started when the CPU 11 receives a read request according to the fax application 40 or the USB-FAX pipe monitor daemon program 34.

At step 201, the CPU 11 determines whether a read request is transmitted according to the USB-FAX pipe monitor daemon program 34. If the CPU 11 determines that the read request is transmitted according to the USB-FAX pipe monitor daemon program 34, the process proceeds to step 202, and if the CPU 11 determines that the read request is not transmitted according to the USB-FAX pipe monitor daemon program 34 (the read request is transmitted according to the fax application 40), the process proceeds to step 204.

At step 202, the CPU 11 transmits the data written in the buffer 1 to the USB-FAX pipe monitor daemon 34.

At step 203, the CPU 11 deletes the data from the buffer 1.

At step 204, the CPU 11 reads data from the buffer 2.

At step 205, the CPU 11 determines whether the data read from the buffer 2 is empty. If the CPU 11 determines that the data read from the buffer 2 is empty, the process proceeds to step 206, and if the CPU 11 determines that the data is not empty, the process proceeds to step 207.

At step 206, the CPU 11 transmits the empty data to the fax application 40 that has transmitted the read request and this process is terminated.

At step 207, the CPU 11 obtains transmission source information like step 103.

At step 208, the CPU 11 reads the permission DB from the storing section 14.

At step 209, the CPU 11 determines whether the data read from the buffer 2 is RING. If the CPU 11 determines that the data is RING, the process proceeds to step 210 and if the CPU 11 determines that the data is not RING, the process proceeds to step 213.

At step 210, the CPU 11 determines whether a predetermined time has passed after the writing of the RING in the buffer 2. If determining that the predetermined time has passed, the CPU 11 determines to be time out and the process proceeds to step 211. If the CPU 11 determines that the predetermined time has not passed, the process proceeds to step 212.

At step 211, the CPU 11 deletes the RING from the buffer 2 and the process proceeds to step 206. If a predetermined time has passed after the writing of the RING in the buffer 2, the RING is already old and the fax modem 22A may not wait for a response to the RING. Therefore, in the present illustrative aspect, if the predetermined time has passed, the RING is deleted from the buffer 2.

When the RING is deleted from the buffer 2 and the fax modem 22A is still waiting for a response to the RING, RING is transmitted again from the fax modem 22A after a short time.

At step 212, the CPU 11 determines whether fax reception is allowed for the transmission source information with reference to the permission DB (permission determination). The permission determination will be explained later. If the CPU 11 determines that the fax reception is allowed, the process proceeds to step 213. If the CPU 11 determines that the fax reception is not allowed, the process proceeds to step 206 and empty data is transmitted to the fax application 40 that has transmitted the read request. Accordingly, the RING is not transferred to the fax application 40, and therefore the fax application 40 cannot detect the RING. The fax application 40 does not start processing that is to be started in response to the RING (transmission of an ATA command).

Even if the CPU 11 determines that fax reception is not allowed and empty data is transmitted to the fax application 40, the RING is not deleted but remains in the buffer 2. Therefore, if new transmission source information that is registered to the permission DB, the determination at step 212 for a read request from the new transmission source is affirmative.

At step 213, the CPU 11 transmits data read from the buffer 2 to the fax application 40.

At step 214, the CPU 11 deletes data from the buffer 2.

(6) Permission Determination

Permission determination is made to determine whether fax transmission and fax reception are allowed for transmission source information with reference to the permission DB.

Figure 9:
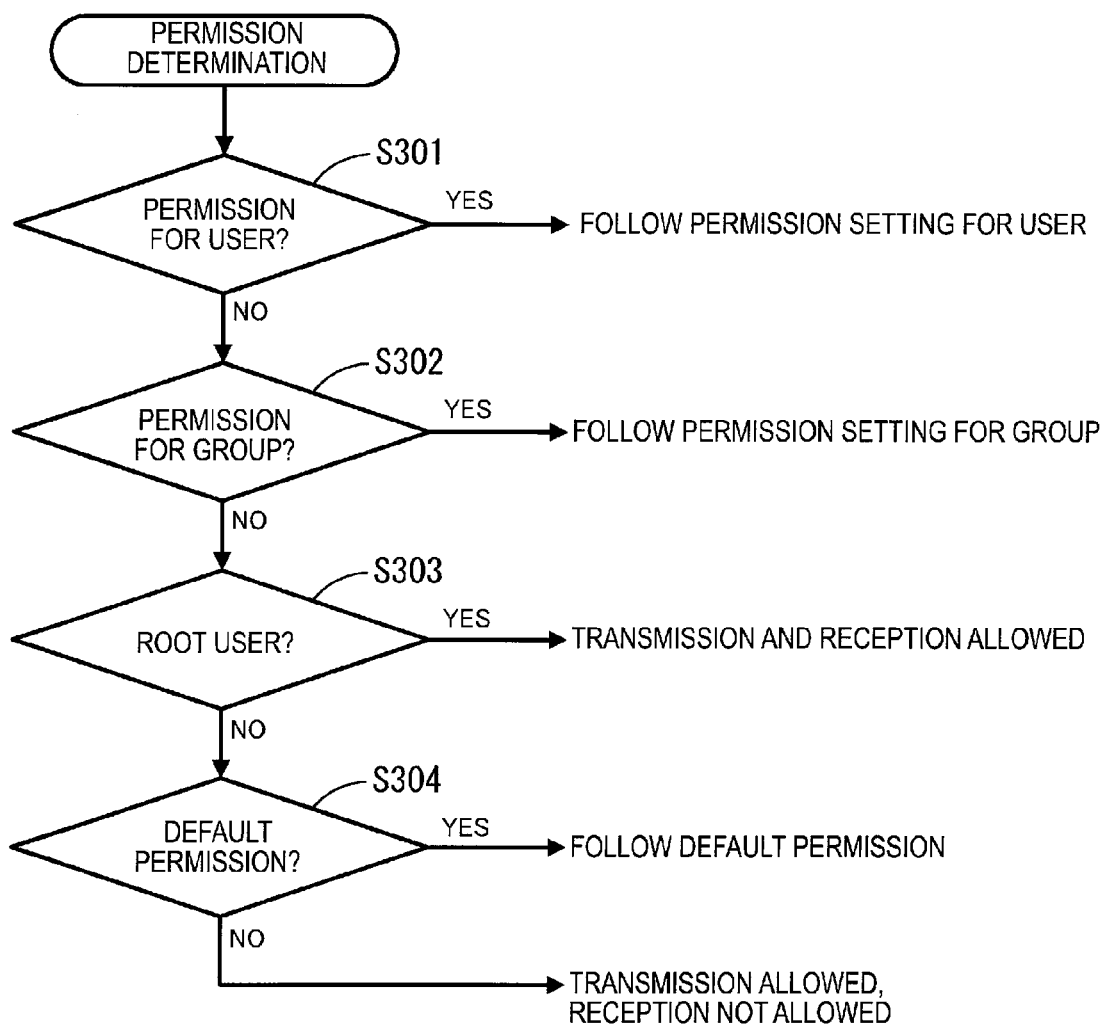
FIG. 9 is a flowchart illustrating a flow of permission determination.

A flow of the permission determination will be explained with reference to FIG. 9. At step 301, the CPU 11 determines whether permission (permission or prohibition of fax transmission and reception) is set for a user ID (an example of information as to a fax application program). If determining that permission is set for the user ID, the CPU 11 determines whether fax transmission and fax reception are allowed according to the permission setting of the user.

At step 302, the CPU 11 determines whether permission is set for a group ID (an example of information concerning a fax application program). If determining that permission is set for the group ID, the CPU 11 determines whether fax transmission and fax reception are allowed according to the permission setting of a group to which the user belongs, the user activating the fax application 40.

At step 303, the CPU 11 determines whether a user is a root user. If determining that a user is a root user, the CPU 11 determines that fax transmission and fax reception are allowed.

At step 304, the CPU 11 determines whether default permission is set. If determining that default permission is set, the CPU 11 determines whether fax transmission and fax reception are allowed according to the default permission setting. The default permission is applied to all users without exception.

If determining that the default permission is not set, the CPU 11 determines that fax transmission is allowed and fax reception is not allowed.

(7) Effects of Illustrative Aspect

In the illustrative aspect of the present invention, the restricting function for using the fax modem 22A and performing facsimile transmission is achieved according to the fax driver 30. Therefore, the restricting function is achieved with a fax modem 22A that has no such a restricting function. According to the fax driver 30, the restricting function with high versatility is achieved.

Further, according to the fax driver 30, transmission sources that make communication with the fax modem 22A are restricted to certain ones with reference to the permission DB.

Further, according to the fax driver 30, the transmission source information representing the transmission source of the AT command is obtained from an OS. The AT command is not configured such that transmission source information representing a transmission source is added thereto, and therefore general fax applications 40 are not configured to have function of transmitting transmission source information to the fax driver 30. Therefore, even if a facsimile device has a function of user permission, the function cannot be used in transmission and reception between a computer and the facsimile device. However, according to the fax driver 30, the transmission source information representing the transmission source of the AT command is obtained from the OS. Therefore, the restricting function can be achieved with using general fax applications that does not have a function of transmitting transmission source information to the fax driver 30. According to the fax driver 30, the restricting function of high versatility is achieved.

Further, according to the fax driver 30, a user ID of a user who executes a fax application 40 is used as the transmission source information. Therefore, the restricting function is achieved by a unit of a user.

Further, according to the fax driver 30, it is determined whether communication with the fax modem 22A is allowed for a predetermined facsimile command. Therefore, the restricting function is achieved with more precisely.

Further, according to the fax driver 30, if a user who is not allowed to perform fax reception is a transmission source of a read request and even if RING is written in the buffer 2, the RING is not transferred to the fax application 40 that has transmitted the read request. Therefore, unnecessary informing of incoming is not performed to a user who is not allowed to perform fax reception.

In the present illustrative aspect, concerning fax reception, in addition to the permission determination whether fax transmission and fax reception are allowed, the permission determination whether RING transmission is allowed is executed. According to some fax applications 40, a pop-up screen may be displayed on the display section 15 at the time of reception of the RING to make a user to select permission or prohibition of the fax reception. In such a case, the pop-up screen may not be displayed on the display section 15 if it is determined that the RING transmission is not allowed. Accordingly, the following problem is not caused. Although allowance to the fax reception is input from the pop-up screen by the user, the fax reception is not performed according to the permission determination.

<Another Illustrative Aspect>

Figure 10:
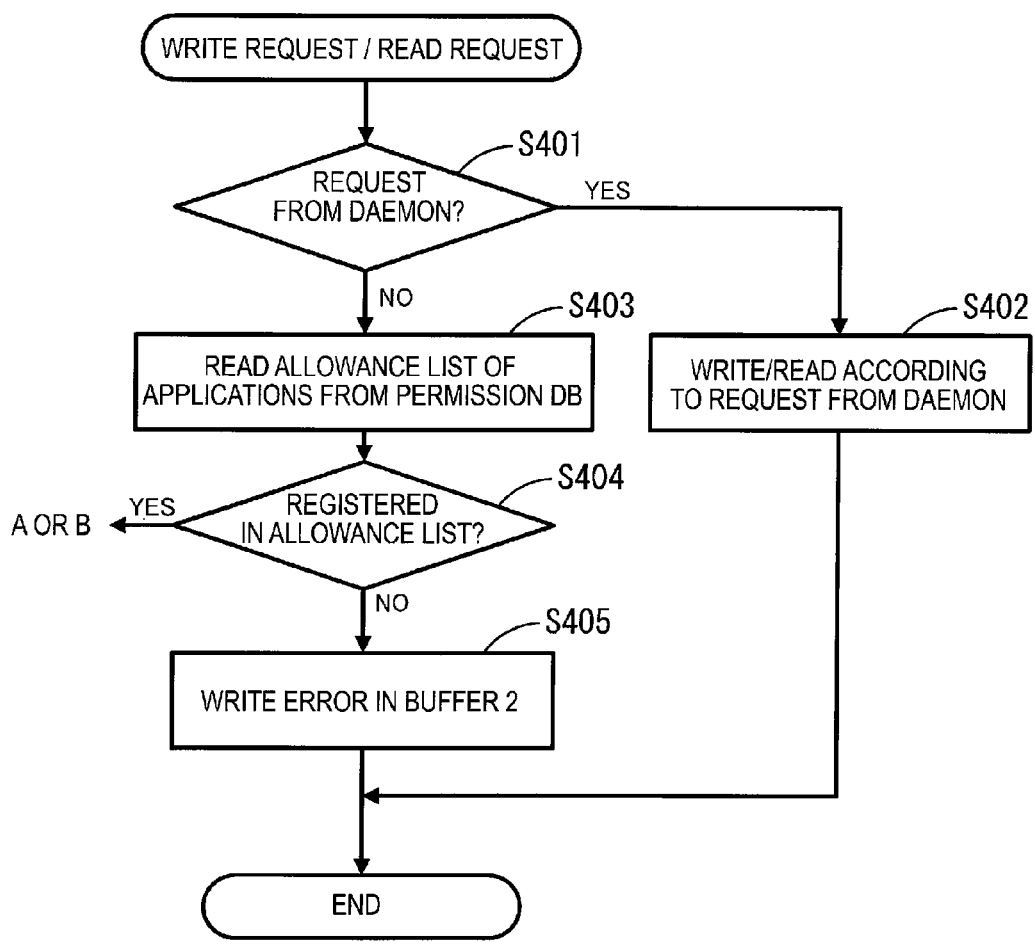
FIG. 10 is a flowchart illustrating a flow of permission determination according to another illustrative aspect of the present invention.

Another illustrative aspect of the present invention will be explained with reference to FIG. 10.

In the another illustrative aspect, a program name of a fax application 40 is obtained as information relating to the fax application 40.

In the permission DB according to the another illustrative aspect, permission or prohibition of communication (permission or prohibition of fax transmission and permission or prohibition of fax reception) is registered by a unit of each program name of fax applications.

A flow of permission determination for a fax application 40 will be explained with reference to FIG. 10. FIG. 10 illustrates a flowchart that is applied commonly to determination of a write request and determination of a read request, and for the flowchart of the permission determination that is not illustrated in FIG. 10, the flowchart in FIG. 7 is applied to the determination of a write request and the flowchart in FIG. 8 is applied to the determination of a read request.

At step 401, the CPU 11 determines whether the received write request/read request is transmitted from the USB-FAX pipe monitor daemon 34. If the CPU 11 determines that it is transmitted from the USB-FAX pipe monitor daemon 34, the process proceeds to step 402, and if the CPU 11 determines that it is not transmitted from the USB-FAX pipe monitor daemon 34 (it is transmitted from the fax application 40), the process proceeds to step 403.

At step 402, the CPU 11 writes data in the buffer 2 in response to the write request transmitted from the USB-FAX pipe monitor daemon 34 or transmits data written in the buffer 1 to the USB-FAX pipe monitor daemon 34 in response to the transmitted read request.

At step 403, the CPU 11 obtains from the permission DB a list (allowance list) of fax applications 40 that are allowed to perform fax communication.

At step 404, the CPU 11 obtains from the OS a program name of the fax application 40 according to which the write request or the read request is transmitted to the fax driver 30, and determines whether the obtained program name is registered in the allowance list.

If determining that the obtained program name is registered in the allowance list, the CPU 11 determines that the obtained program is a fax application 40 that is allowed to perform fax communication. When a write request is received, the process proceeds to step 103 in FIG. 7, and when a read request is received, the process proceeds to step 204 in FIG. 8.

If determining that the obtained program name is not registered in the allowance list, the CPU 11 determines that the obtained program is a fax application 40 that is not allowed to perform fax communication, and the process proceeds to step 405.

At step 405, the CPU 11 writes an error in the buffer 2 and terminates the process.

According to the fax driver 30 of the another illustrative aspect, a program name of a fax application 40 is used as transmission source information. Therefore, the restricting function is achieved by a unit of a fax application 40.

For example, log management may be performed for fax transmission and fax reception. The log management may be performed according to the fax driver 30 or the fax application 40. In performing the log management according to the fax application 40, logs are centrally managed by allowing to use only the fax application 40 having a function of writing a log in a common location.

<Additional Illustrative Aspect>

Figure 11:
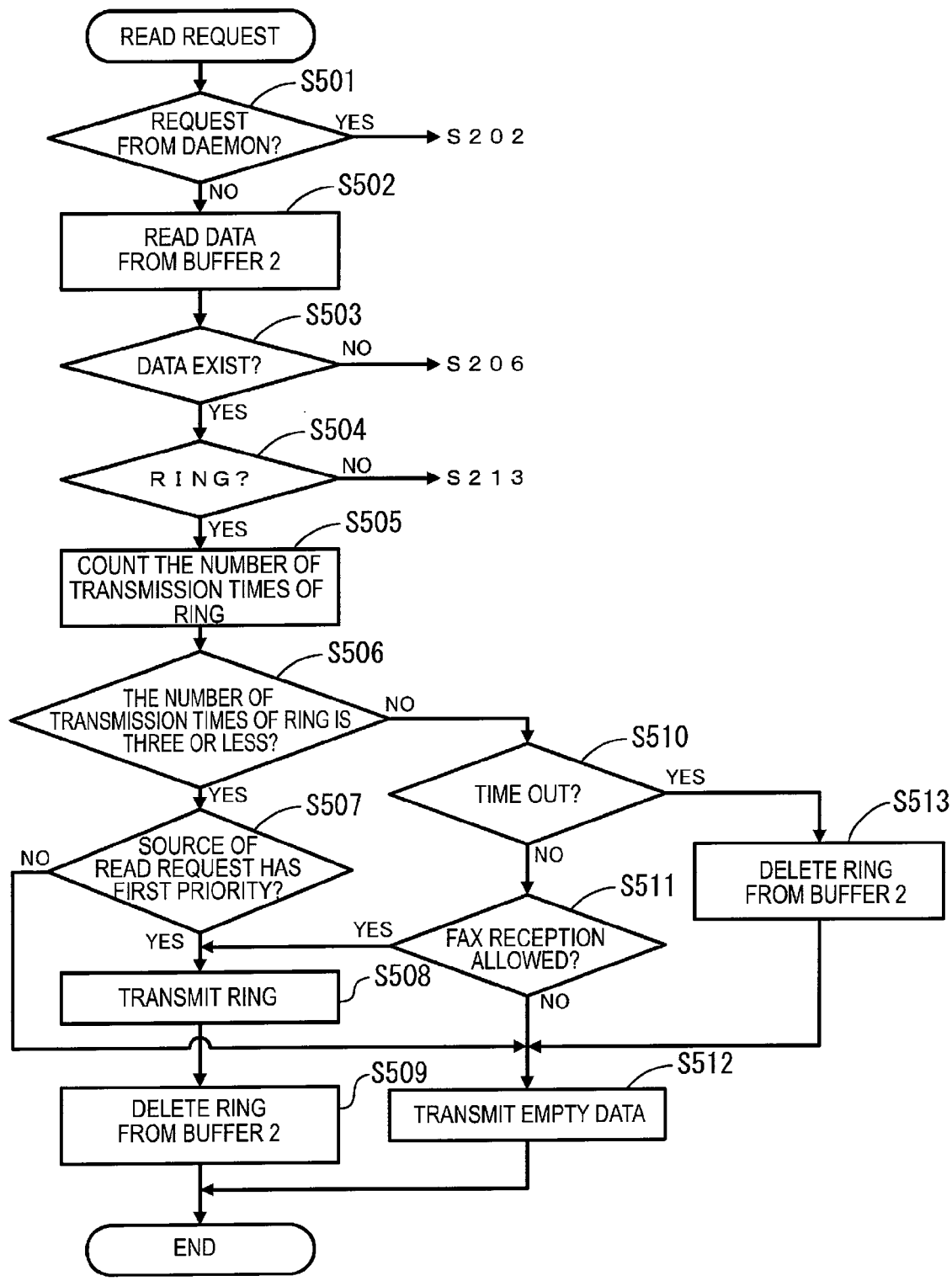
FIG. 11 is a flowchart illustrating a flow of determination according to an additional illustrative aspect of the present invention when receiving a read request.

Next, an additional illustrative aspect of the present invention will be explained with reference to FIG. 11.

According to the additional illustrative aspect, if the number of transmission times of the RING is three or less, only a user having a first priority is allowed to perform fax reception, and if the number of transmission times of the RING is four or greater, among all the users who are allowed to perform fax reception, a user who transmits a read request first (a fax application 40 according to which a read request is transmitted first) is allowed to perform fax reception.

A determination flow in receiving a read request will be explained with reference to FIG. 11. The CPU 11 executes the RING monitor program to execute this process. This process is started when the CPU 11 receives a read request from the fax application 40 or the USB-FAX pipe monitor daemon 34.

At step 501, the CPU 11 determines whether the read request is transmitted from the USB-FAX pipe monitor daemon 34. If the CPU 11 determines that it is transmitted from the USB-FAX pipe monitor daemon 34, the process proceeds to step 202 in FIG. 8. If the CPU 11 determines that it is not transmitted from the USB-FAX pipe monitor daemon 34 (it is transmitted from the fax application 40), the process proceeds to step 502.

At step 502, the CPU 11 reads data from the buffer 2.

At step 503, the CPU 11 determines whether the data read from the buffer 2 is empty or not. If the CPU 11 determines that the data is not empty, the process proceeds to step 504, and if the CPU 11 determines that the data is empty, the process proceeds to step 206 in FIG. 8.

At step 504, the CPU 11 determines whether the data read from the buffer 2 is RING. If the CPU 11 determines that the data is RING, the process proceeds to step 505 and if the CPU 11 determines that the data is not RING, the process proceeds to step 213 in FIG. 8.

At step 505, the CPU 11 counts the number of transmission times of the read RING. Specifically, a series of RING is transmitted from the fax modem 22A to the fax application 40 after the disconnection of the line, and the series of RING is transmitted again after a predetermined time, if no response (ATA command) is transmitted from the fax application 40. The number of transmission times of a series of RING is predetermined. Every time the CPU 11 receives a series of RING, the CPU 11 increments a counter by one to count the number of transmission times of RING. The counter is reset to zero when the fax application 40 responds to the RING or in case of time out. If the RING is ignored without being responded by the fax application 40 for a predetermined time or more and the series of RING is transmitted from the fax modem 22A, the counter counts from one again.

At step 506, the CPU 11 determines whether the number of transmission times of the RING is three or less. If the CPU 11 determines that the number of transmission times of the RING is three or less, the process proceeds to step 507. If the CPU 11 determines that the number of transmission times of the RING is four or more, the process proceeds to step 510.

At step 507, the CPU 11 determines whether the user (who started the fax application 40 according to which the read request is transmitted) who transmitted the read request (that makes this process to be executed) has a first priority. If the CPU 11 determines that the user has a first priority, the process proceeds to step 508 and if the CPU 11 determines that the user does not have a first priority, the process proceeds to step 512.

At step 508, the CPU 11 transmit the RING to the fax application 40 that transmitted the read request.

At step 509, the CPU 11 deletes the RING from the buffer 2.

At step 510, the CPU 11 determines whether a predetermined time has passed after the RING was written in the buffer 2. If the CPU 11 determines that the predetermined time has not passed, the process proceeds to step 511, and if determining that the predetermined time has passed, the CPU 11 determines to be time out and the process proceeds to step 513.

At step 511, the CPU 11 performs permission determination of the user who transmitted the read request to determine whether the fax reception is allowed. If the CPU 11 determines that the fax reception is allowed, the process proceeds to step 508 and if the CPU 11 determines that the fax reception is not allowed, the process proceeds to step 512.

At step 512, the CPU 11 transmits empty data to the fax application 40 that transmitted the read request and terminates the process.

At step 513, the CPU 11 deletes the RING from the buffer 2.

According to the fax driver 30 of the additional illustrative aspect, if a plurality of fax applications 40 (client devices) are allowed to perform communication with the fax modem 22A, the CPU 11 determines to which one of the fax applications 40 the informing of incoming is transferred according to a predetermined priority order. Therefore, if a plurality of fax applications 40 are allowed to perform communication with the fax modem 22A, the fax application 40 to which the RING is transferred is appropriately determined.

<Other Illustrative Aspects>

The present invention is not restricted to the aspects explained in the above description made with reference to the drawings. The following aspects may be included in the technical scope of the present invention, for example.

(1) In the above illustrative aspects, when a connection request is received from an external facsimile device via a telephone line, the line is connected to receive fax data and the received fax data is stored in the fax data storing section 22B. When a connection request is received from an external facsimile device, the RING may be transmitted to the fax application 40 and the line may be connected after an ATA command is received.

(2) In the above illustrative aspects, the client computer 10 functions as a client device and a computer. However, a computer and a client device may be configured independently of each other.

(3) In the above illustrative aspects, the CPU 11 functions as a computer to execute the fax driver 30, the fax application 40, the driver R/W request processing program 31, the AT command monitor program 32, the RING monitor program 33, the USB-FAX pipe monitor daemon 34. However, an independent CPU may be provided for each of the programs.

What is claimed is:

1. A non-transitory computer readable medium storing a computer executable facsimile driver program including instructions that, when executed by a computer connected to a facsimile device, cause the computer to:

receive a facsimile command from a facsimile application program, the facsimile command comprising one of a transmission command and a reception command;

determine whether the received facsimile command comprises the transmission command or the reception command;

obtain transmission source information of the received facsimile command, the transmission source information representing a particular transmission source from which the facsimile command is transmitted;

when determining that the received facsimile command comprises the transmission command, determine whether the particular transmission source represented by the obtained transmission source information is allowed to execute facsimile transmission by referring to first transmission source information registered in a memory of the computer, the registered first transmission source information representing transmission sources that are allowed to execute facsimile transmission with the facsimile device;

transfer the received facsimile command to the facsimile device when determining that the particular transmission source represented by the obtained transmission source information is allowed to execute the facsimile transmission with the facsimile device;

when determining that the received facsimile command comprises the reception command, determine whether the particular transmission source represented by the obtained transmission source information is allowed to execute facsimile reception by referring to second transmission source information registered in the memory of the computer, the registered second transmission source information representing transmission sources that are allowed to execute facsimile reception with the facsimile device; and transfer the received facsimile command to the facsimile device when determining that the particular transmission source represented by the obtained transmission source information is allowed to execute facsimile reception with the facsimile device.

2. The non-transitory computer readable medium according to claim 1, wherein the instructions further cause the computer to:
register the first transmission source information and the second transmission source information in the memory of the computer.

3. The non-transitory computer readable medium according to claim 1,
wherein the computer executes an operating system and executes the facsimile application program under control of the operating system, and
wherein the obtained transmission source information comprises information concerning the facsimile application program and is obtained from the operating system.

4. The non-transitory computer readable medium according to claim 3, wherein the obtained transmission source information includes user identification information of a user who activates the facsimile application program.

5. The non-transitory computer readable medium according to claim 3, wherein the obtained transmission source information includes a program name of the facsimile application program.

6. The non-transitory computer readable medium according to claim 1, wherein the instructions further cause the computer to:
receive notification of an incoming facsimile from the facsimile device;
determine whether the obtained transmission source information represents that the particular transmission source is allowed to execute the incoming facsimile in response to receiving the notification; and
transfer the notification to the particular transmission source when determining that the obtained transmission source information represents that the particular transmission source is allowed to execute facsimile reception.

7. The non-transitory computer readable medium according to claim 6,
wherein the memory further stores a priority order of transmission sources, and
wherein the instructions further cause the computer to transfer the notification according to the priority order stored in the memory.

8. A system comprising:
a facsimile device; and
a computer configured to execute a facsimile application program and configured to communicate with the facsimile device,
the computer including:
a receiver configured to receive a facsimile command from the facsimile application program, the facsimile command comprising one of a transmission command and a reception command;
a control device; and
memory storing first transmission source information representing transmission sources that are allowed to execute facsimile transmission with the facsimile device and storing second transmission source information representing transmission sources that are allowed to execute facsimile reception with the facsimile device, the memory further storing a computer executable facsimile driver program that, when executed by the control device, causes the computer to:
determine whether the received facsimile command comprises the transmission command or the reception command;
obtain transmission source information of the received facsimile command, the transmission source information representing a particular transmission source from which the facsimile command is transmitted;
when determining that the received facsimile command comprises the transmission command, determine whether the particular transmission source represented by the obtained transmission source information is allowed to execute facsimile transmission by referring to the first transmission source information;
transfer the received facsimile command to the facsimile device when determining that the particular transmission source represented by the obtained transmission source information is allowed to execute facsimile transmission with the facsimile device;
when determining that the received facsimile command comprises the reception command, determine whether the particular transmission source represented by the obtained transmission source information is allowed to execute facsimile reception by referring to the second transmission source information; and
transfer the received facsimile command to the facsimile device when determining that the particular transmission source represented by the obtained transmission source information is allowed to execute facsimile reception with the facsimile device.

9. A computer executable method for controlling communication between a computer storing a computer executable facsimile driver program and a facsimile device, the method comprising steps of:
a receiving step of receiving a facsimile command from a facsimile application program, the facsimile command comprising one of a transmission command and a reception command;
a first determining step of determining whether the received facsimile command comprises the transmission command or the reception command;
an obtaining step of obtaining transmission source information of the received facsimile command, the transmission source information representing a particular transmission source from which the facsimile command is transmitted;
when determining that the received facsimile command comprises the transmission command in the first determining step, a second determining step of determining whether the particular transmission source represented by the obtained transmission source information is allowed to execute facsimile transmission by referring to first transmission source information registered in a memory of the computer, the registered first transmission source information representing transmission sources that are allowed to execute facsimile transmission with the facsimile device;
a first transferring step of transferring the received facsimile command to the facsimile device when determining in the second determining step that the particular transmission source represented by the obtained transmission source information is allowed to execute the facsimile transmission with the facsimile device;

when determining that the received facsimile command comprises the reception command in the first determining step, a third determining step of determining whether the particular transmission source represented by the obtained transmission source information is allowed to execute facsimile reception by referring to second transmission source information registered in the memory of the computer, the registered second transmission source information representing transmission sources that are allowed to execute facsimile reception with the facsimile device; and a second transferring step of transferring the received facsimile command to the facsimile device when determining in the third determining step that the particular transmission source represented by the obtained transmission source information is allowed to execute facsimile reception with the facsimile device.

10. The computer executable method according to claim 9, further comprising:
a registering step of registering the first transmission source information and the second transmission source information in the memory of the computer.

11. The computer executable method according to claim 9, wherein the computer executes an operating system and executes the facsimile application program under control of the operating system, and
wherein the obtained transmission source information obtained at the obtaining step comprises information concerning the facsimile application program and is obtained from the operating system.

12. The computer executable method according to claim 11, wherein the obtained transmission source information includes user identification information of a user who activates the facsimile application program.

13. The computer executable method according to claim 11, wherein the obtained transmission source information includes a program name of the facsimile application program.

14. The computer executable method according to claim 9, further comprising:
a second receiving step of receiving a notification of an incoming facsimile from the facsimile device;
a fourth determining step of determining whether the obtained transmission source information represents that the particular transmission source is allowed to execute the incoming facsimile in response to receiving the notification in the second receiving step; and
a third transferring step of transferring the notification to the particular transmission source when determining in the fourth determining step that the obtained transmission source information represents that the particular transmission source is allowed to execute facsimile reception.

15. The computer executable method according to claim 14, wherein transferring the notification in the third transferring step is performed according to a priority order stored in the memory, the priority order specifying an order of transmission sources.

16. The system of claim 8, wherein the control device comprises at least one processor.

* * * * *